United States Patent [19]

Urban et al.

[11] 3,893,696
[45] July 8, 1975

[54] RELAY COMPENSATOR VALVE

[75] Inventors: John A. Urban, Livonia; Gary L. Hopkins, Southfield, Mich.

[73] Assignee: Eaton Corporation, Cleveland, Ohio

[22] Filed: Apr. 8, 1974

[21] Appl. No.: 458,608

Related U.S. Application Data

[63] Continuation of Ser. No. 293,868, Oct. 2, 1972, abandoned, which is a continuation-in-part of Ser. No. 271,824, July 14, 1972, abandoned, which is a continuation of Ser. No. 125,280, March 17, 1971, abandoned.

[52] U.S. Cl. .................... 303/21 F; 303/40; 303/68
[51] Int. Cl. ........................ B60t 8/06; B60t 15/12
[58] Field of Search ............ 303/21, 7, 40, 6 R, 24, 303/40, 61–63, 68–69; 188/181; 137/627.5

[56] References Cited
UNITED STATES PATENTS

| | | |
|---|---|---|
| 2,279,398 | 4/1972 | Hewitt .............................. 303/21 F |
| 2,417,211 | 3/1947 | Newell.............................. 303/21 F |
| 3,006,696 | 10/1961 | Yarber .............................. 303/24 R |
| 3,503,654 | 3/1970 | Stamm .............................. 303/6 R |
| 3,552,802 | 1/1971 | Packer et al. ..................... 303/21 F |
| 3,695,734 | 10/1972 | Hennig et al. ..................... 303/21 F |
| 3,718,372 | 2/1973 | Gruner et al. ......................... 303/7 |

*Primary Examiner*—Trygve M. Blix
*Assistant Examiner*—D. C. Butler
*Attorney, Agent, or Firm*—Teagno & Toddy

[57] ABSTRACT

A relay valve for cycling brake pressure with the brake pressure rise curve being characterized by a rapid first stage rise rate and a substantially slower second stage rise rate, and wherein the valve includes a compensator assembly including a spring to control the changeover from the first stage to the second stage pressure rise rate.

23 Claims, 6 Drawing Figures

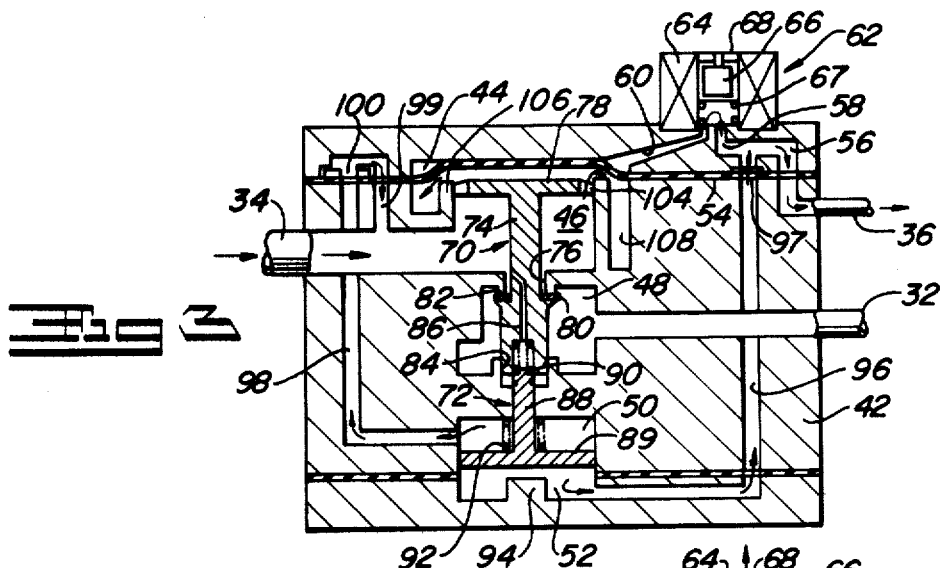
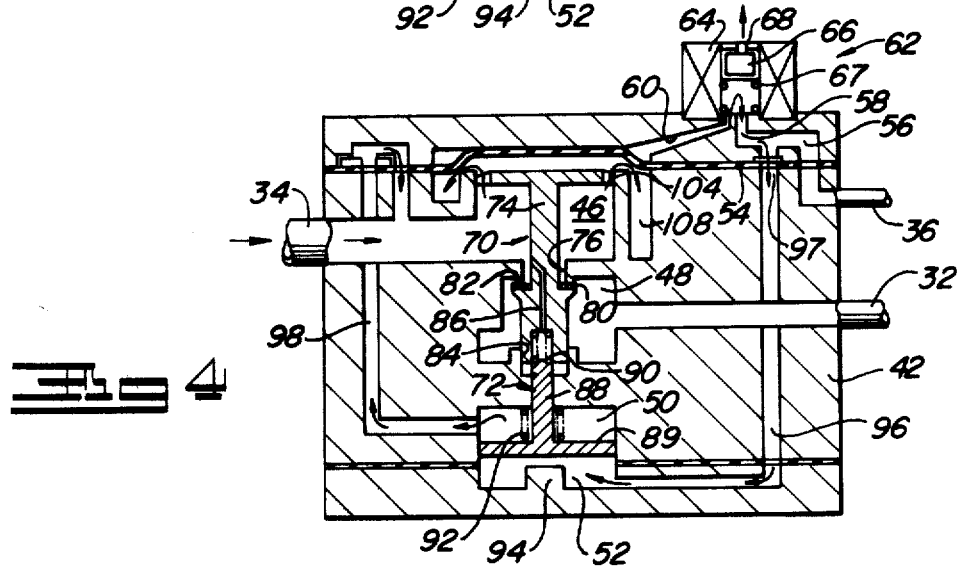
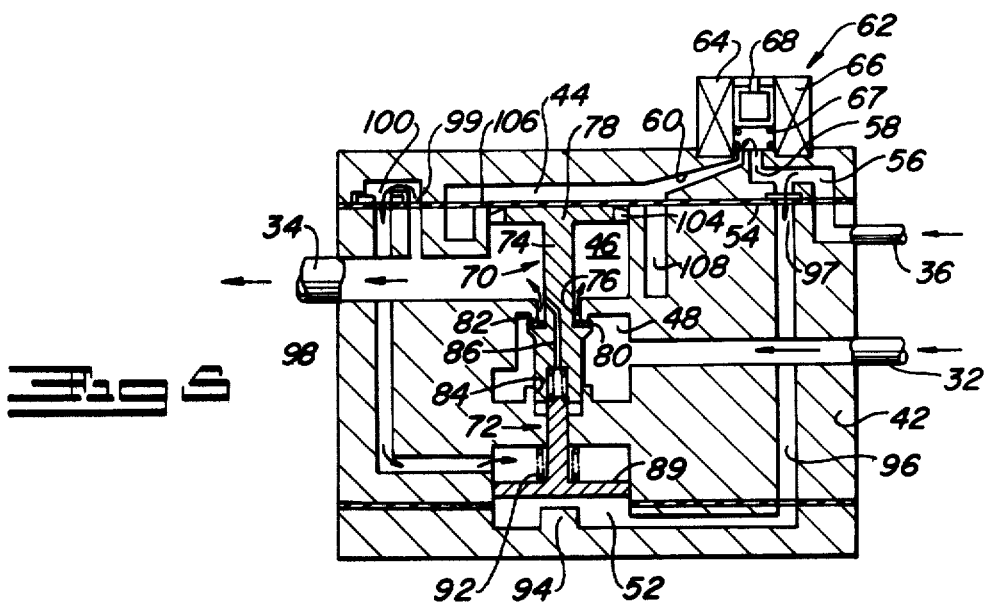

RELAY COMPENSATOR VALVE

CROSS-REFERENCE TO RELATED PATENT APPLICATIONS

This application is a continuation of Ser. No. 293,868, filed Oct. 2, 1972, now abandoned, which was a continuation-in-part of Ser. No. 271,824 filed July 14, 1972, now abandoned, which in turn was a continuation of application Ser. No. 125,280 filed Mar. 17, 1971, now abandoned.

BACKGROUND OF THE INVENTION

This invention relates to a pressure modulating relay valve and, more particularly, to a control valve for controlling the applied brake pressure in an anti-skid system.

The prior art has long recognized that to brake a vehicle in the shortest possible distance, the braking pressure should be maintained at a level where there is maximum braking effort. However, it is also well recognized that the optimum brake pressure to stop a vehicle varies with several factors including the particular road conditions on which the vehicle is traveling. As a result, there is for any brake system a family of ideal brake pressure curves which are applicable for different road conditions.

Numerous prior art systems have been developed for varying automatically braking pressure in accordance with road conditions thereby to simulate as closely as possible the ideal brake pressure curve for the particular road condition encountered when the brakes are applied. In general, these prior art systems have used various types of sensors to detect a locked wheel or an impending wheel lock and, in accordance with the signals generated by the sensors, the brake pressure has been relieved allowing the wheel to roll back up to speed, at which time the brake pressure is reapplied. Ideally in such systems, as soon as the impending wheel lock is detected the brake pressure should be relieved immediately thereby to avoid an actual lock condition. Also, after the brake pressure has been relieved and the wheel speed is increasing, it is desirable to reapply the braking pressure as quickly as possible but at a level no higher than that which will maintain wheel slip at an optimum. As a practical matter, these ideal conditions are difficult to achieve so the prior art systems have attempted to simulate the ideal brake pressure curve for the particular road conditions by cyclical application of the brake pressure.

There is disclosed in the aforementioned copending application a relay compensator valve which, in one mode, serves as a pilot operated relay valve and which, in another mode, functions as a cyclically operated pressure compensating valve. In the latter mode, the valve is responsive to a signal from an anti-skid system to rapidly relieve the brake pressure. Upon termination of the anit-skid signal, the valve reapplies brake pressure with the brake pressure rise curve being characterized by a rapid first stage rise rate followed by a substantially slower second stage rise rate. The change from the first to second stage is characterized by a discontinuity or knee in the brake pressure rise curve. The two stage rise in brake pressure has the decided advantage that it permits reestablishment of braking forces as quickly as possible while minimizing overshoot of the ideal brake pressure for the particlar road condition.

SUMMARY OF THE INVENTION

The valve disclosed in the aforementioned patent application employs a differential effective area between primary and secondary pistons to establish the discontinuity or knee in the brake pressure rise curve. The invention carries forward the concepts and principles of operation of the valve disclosed in that application; however, instead of utilizing a differential effective area between secondary and primary pistons to establish the knee in the brake pressure rise curve, the present invention contemplates primary and secondary pistons having equal affective areas with a compensating spring acting on the secondary piston to establish the location of the knee.

More particularly, the invention contemplates a pressure compensator relay valve for use in a skid control system wherein the system includes a brake for applying braking forces to a wheel, a fluid pressure operated brake actuator for actuating the brake, skid control sensor means for detecting a skid condition at the wheel and generating an electrical signal in response thereto, a source of fluid pressure for application to the brake actuator and supply means for supplying a variable control pressure. The improved pressure compensating skid control valve comprises a valve housing having a control pressure chamber, an inlet pressure chamber, an outlet pressure chamber, a compensating pressure chamber and a bias pressure chamber. A valve passage interconnects the inlet and outlet pressure chambers with valve means controlling flow through the passage. The valve means includes a first piston portion and a second piston portion with the first piston portion having one surface operatively exposed to the pressure in control chamber and another surface operatively exposed to the pressure in the outlet chamber while the second piston portion has one surface operatively exposed to the pressure in the compensating chamber and another surface operatively exposed to the pressure in the bias chamber. A flow passage interconnects the bias chamber with the fluid pressure source and another flow passage interconnects the outlet pressure chamber and the compensating chamber with flow restricting means in both flow passages for restricting the flow of fluid through the flow passages. The fluid pressure in the control chamber and the compensator chamber acts on the associated piston portion to urge the valve means in a passage opening direction while the pressure in the outlet chamber and the bias chamber acts on the associated piston portion to urge the valve means in a passage closing position. Biasing means, which in the preferred embodiment comprises a spring, is operatively associated with the second piston portion to supplement the forces exerted on that piston portion by the fluid pressure in the compensating chamber.

A more complete understanding of the features and advantages of the compensating relay valve will be obtained from a complete reading of the following description which, together with the attached drawings, discloses but a preferred embodiment of the invention.

DESCRIPTION OF THE DRAWINGS

Referring now to the drawings wherein like reference numerals indicate like parts in the various views:

FIG. 3 is a sectional view similar to FIG. 2 showing the valve in a normal brake release condition.

FIG. 4 is a sectional veiw similar to FIG. 2 showing the valve in a skid control brake release condition.

FIG. 5 is a sectional veiw of the valve showing the valve as the brake pressure is being reapplied at a slow rate after an initial rapid reapplication of pressure.

DESCRIPTION OF THE PREFERRED EMBODIMENT

Figure 1:
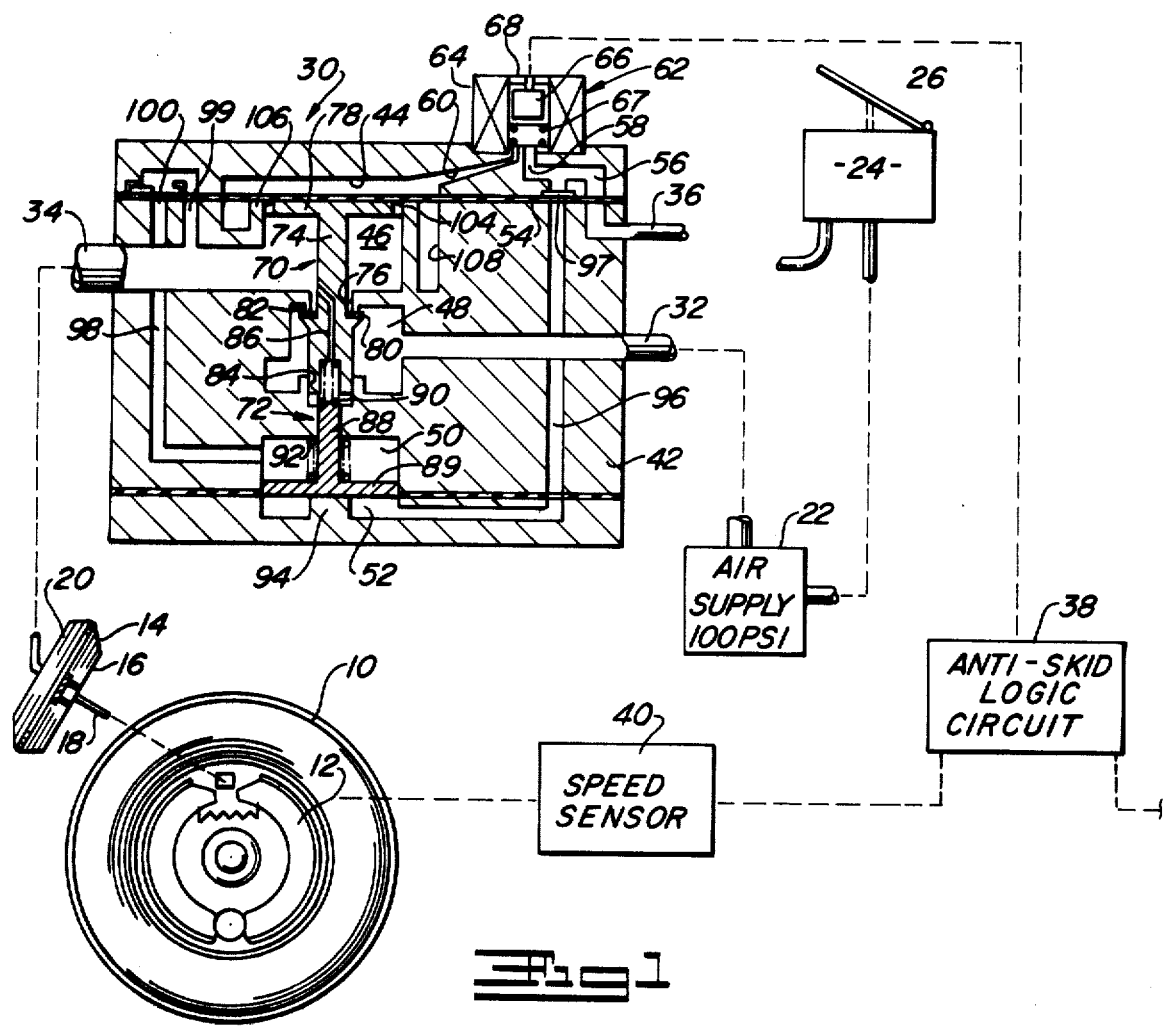
FIG. 1 is a schematic diagram of an anti-skid brake system in which the compensator valve, shown in section, may be employed.

Referring now more in detail to the drawings, FIG. 1 illustrates schematically one type of brake system in which the valve may be employed. As shown, the system comprises an air brake system which may, for example, be employed on a truck although it will be appreciated that the valve may be employed with other types of vehicles and in other types of brake systems as well. As illustrated, the truck includes a wheel 10 and a conventional wedge type brake 12 which is adapted to be operated by a brake actuator 14. The brake actuator may be of any form but as shown comprises a diaphram 16, a piston 18 and a fluid pressure chamber 20 into which pressurized fluid is admitted to actuate the brakes 12. The brake system further includes a high pressure air reservoir 22 and a conventional treadle valve 24 connected to the reservoir. The treadle valve 24 is operated by an operator controlled treadle 26 with the pressure of the air flowing throuogh the valve 24 being proportional to the amount of treadle deflection.

A skid control compensating relay valve constructed in accordance with the principles of this invention is indicated generally by the reference numeral 30. The valve 30 is connected by a conduit 32 to the air reservoir 22 and by conduit 34 to the pressure chamber 20 of the brake actuator 14. It will be appreciated that the same conduit 34 may also be connected to the brake actuator associated with the other wheel on the same axle as the wheel 10.

The valve 30 is also connected by conduit 36 to the treadle valve 24.

The brake control system further includes an anti-skid logic circuit 38 and a skid sensor device 40. Since neither the anti-skid circuit nor the sensor, as such, form any part of the invention and since they may for purposes of this disclosure be conventional in construction, the details of these two components have been omitted. In general, the function of the logic circuit is to receive signals from the skid sensor 40, detect either a wheel lock or an impending wheel lock, and generate a signal which, as will be described hereinafter, is utilized to acutate the operation of the valve 30. The logic circuit may operate in various ways but, for example, may be used to detect differential wheel speeds or wheel deceleration, either of which would be indicative of a wheel lock or an impending wheel lock. The skid sensor 40 may be an electromagnetic sensor which generates a signal proportional to the rotational speed of the wheel 10 with that signal being utilized in the logic circuit 38.

The valve 30, the details of which will be described hereinafter, functions as a conventional relay valve during normal braking operation but when a skid condition is encountered functions as an integral part of the skid control system. In the relay mode of operation, that is, in the absence of a skid signal, the valve 30 regulates the air pressure supplied to the brake actuator 14 in proportion to the air pressure supplied by the treadle valve 24. However, if a wheel lock condition is detected, a skid signal will be generated by the anti-skid logic circuit 38, and this signal will be applied to the valve 30. The valve 30 will then be actuated to block the flow of air from the air reservoir 22 to the brake actuator 14 and, simultaneously, vent the chamber 20 of the acutator to atmosphere. When the skid condition which triggered the logic 38 has been relieved, the valve 30 is actuated to reapply brake pressure at a rapid rate up to a level lower than the pressure level of the previous cycle, followed by a further increase in the brake pressure at a slower rate.

With this general understanding of the operation of the brake system, the details of valve 30 will now be described.

Referring to FIG. 1, the valve is illustrated in its unactuated condition and includes a valve housing 42 in which there are five main chambers, namely, a control pressure chamber 44, a brake pressure chamber or outlet chamber 46, a high pressure or inlet chamber 48, a compensating chamber 50, and a biasing chamber 52. A control diaphram 54 separates the control chamber 44 from the pressure chamber 46 with the control chamber being connected by passages 56, 58 and 60 to conduit 36.

A three-way solenoid valve 62 controls communication between the control chamber 44 and the conduit 36. The valve 62 includes a coil 64, a core 66 and a spring 67 acting on the core 66 to bias the core to a position where it closes an exhaust port 68. Upon actuation of the solenoid, the core 66 is pulled down against the bias of the spring 67 and blocks off the flow of fluid between passages 58 and 60 while, simultaneously, opening the exhaust passage 68 so that any pressure in the control chamber 44 is exhausted through the exhaust passage.

To control the flow of fluid between the high pressure chamber 48 and the brake pressure chamber 46, there is provided a valve member which comprises a primary piston, indicated generally by the reference numeral 70, and a secondary piston indicated generally by the reference numeral 72. The primary piston 70 comprises a stem portion 74 which extends through a valve opening 76 into both of chambers 46, 48. A piston portion 78 is formed on the upper end of the stem in the chamber 46. An annular seal 80 carried by the stem 74 cooperates with an annular lip 82 around opening 76 defining a valve seat. The other or lower end of the stem 74 is slidably received in a cylindrical recess 84 with the lower end of the stem carrying appropriate seals to prevent high pressure fluid from chamber 48 acting on the bottom of the stem 74. A pressure equalizing passage 86 extends along the longitudinal axis of the stem 74 opening at one end in the chamber 46 and at its other end in recess 84 which defines an equalizing chamber.

The secondary piston 72 comprises a stem portion 88 and a piston portion 89. The stem 88 is positioned for reciprocation in a bore which is coaxial with the longitudinal axis of stem 74. The axially adjacent ends of the stems 74, 88 are normally separated by a light coil spring 90 with one end of the coil spring resting against the end of the stem 88 while the other end of the coil spring is received in a recess in the end of the stem 74. It will be appreciated that the spring 90 normally biases the secondary piston 72 downward and the primary piston 74 upward.

The piston portion 89 of the secondary piston 72 serves to separate the compensator chamber 50 from the bias chamber 52. Appropriate seals may be provided around the periphery of the piston portion 89 to prevent leakage between the two chambers. The piston portion 89 has substantially the same effective area as the piston portion 78.

A bias spring 92 is positioned around the stem 88 in the compensator chamber 50 and acts against the piston portion 89 to bias it in a downward direction. An abutment stop 94 in the bias chamber acts to limit the movement of the piston under the bias of spring 92.

The bias chamber 52 is connected by passage 96 with the inlet passage 56. A bias orifice 97 is positioned in the passage 96 to meter the fluid flow through that passage.

The compensating chamber 50 is connected by passages 98, 99 with the brake pressure chamber 46. A compensator fill and exhaust orifice 100 is positioned in the passage 98 to meter the fluid flow through that passage.

The remaining portions of the valve 30 will be described in connection with the following description of the operation of the valve. To facilitate a complete understanding of the valve, its operation will be described with reference to each of the modes in which it functions.

Relay Mode-Brake Apply

Figure 2:
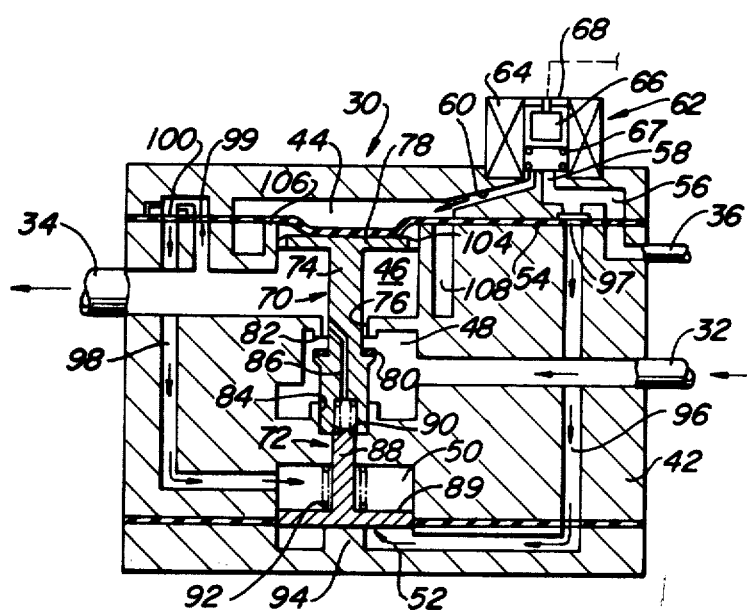
FIG. 2 is a sectional view through the valve illustrating the relationship of the parts during normal relay operation.

Prior to application of the brake, the parts of the valve 30 are as illustrated in FIG. 1. When the brakes are to be applied, the operator depresses the treadle 26 thereby actuating the treadle valve 24 to allow air to flow from the air reservoir 22 through conduit 36, passages 56, 58, normally open valve 62 and passage 60 into the control chamber 44. The pressure in control chamber 44 rises rapidly and acts on the diaphram 54 to push the primary piston 70 downwardly, thereby unseating seal 80 from the valve seat 82 and allowing high pressure air to flow from the high pressure chamber 48 to the brake pressure chamber 46. FIG. 2 illustrates the valve 30 in this mode of operation.

The fluid in chamber 46 passes from conduit 34 to the working chamber 20 of the brake actuator 14 and acts against the diaphram 16 to displace the piston 18 and actuate the brakes 12. As the brakes are applied, the pressure in the brake chamber 46 rises rapidly and begins to counteract the downward force exerted by the pressure in the control chamber 44 on primary piston 70. As the pressure in the chamber 46 builds up to the level of the control chamber pressure, the net forces acting on the primary piston 70 approach a balanced condition and the spring 90 acts to move the piston back up to a position where seal 80 is seated against the valve seat thereby closing off the flow of air from the high pressure chamber 48 to the brake pressure chamber 46.

Should the operator further depress the treadle 26, additional pressure would be admitted to the control chamber 44 and the primary piston 70 would again move downwardly to unseat the valve and permit additional air pressure to flow into the brake pressure chamber 46 until the pressures across the control diaphram and piston reach a balanced condition as described above and the valve automatically closes.

During this sequence of operation, control air pressure flowing from the treadle valve 24 also passes through the bias orifice 97 and passage 96 into the bias chamber 52. Simultaneously the air pressure from the brake pressure chamber 46 is communicated through passage 99, compensator fill orifice 100 and passage 98 to the compensator chamber 50. Since the pressures in the compensator chamber 50 are substantially the same as the pressures built up in the bias chamber 52 and with the added force of the biasing spring 92, the secondary piston 72 remains seated against the abutment stop 94.

Relay Mode-Brake Release

The condition of the valve 30 during brake release is illustrated in FIG. 3. When the operator releases the treadle 26, the control pressure in the control chamber 44 discharges back through the normally open solenoid valve 62 and is vented to the atmosphere through the treadle valve 24 in a conventional manner. The venting of the air pressure in the control chamber 44 thereby establishes a pressure imbalance across the diaphram 54 and the piston portion 78 with the higher pressure being present in the brake pressure chamber 46. The pressure in chamber 46 acts through suitable openings 104 in the piston portion 78 against the underside of the diaphram to move the diaphram upward and unseat it from engagement with an annular lip 106. The movement of the diaphram away from the lip 106 places the brake pressure chamber 46 in communication with an exhaust passage 108 thereby venting the chamber 46 and the brake actuator 14 to the atmosphere.

It will be appreciated that as the pressure in the control chamber 44 is vented, the pressure in bias chamber 52 is also vented through the orifice 97. Similarly, the pressure in the compensator chamber 50 is vented back through the orifice 100 to the brake pressure chamber and then to atmosphere.

Compensating Mode

In the compensating or skid control mode the valve is cyclically operated to apply, release and reapply the brakes. Each cycle of the valve comprises a brake release mode, a first stage brake apply mode and a second stage brake apply mode.

Figure 6:
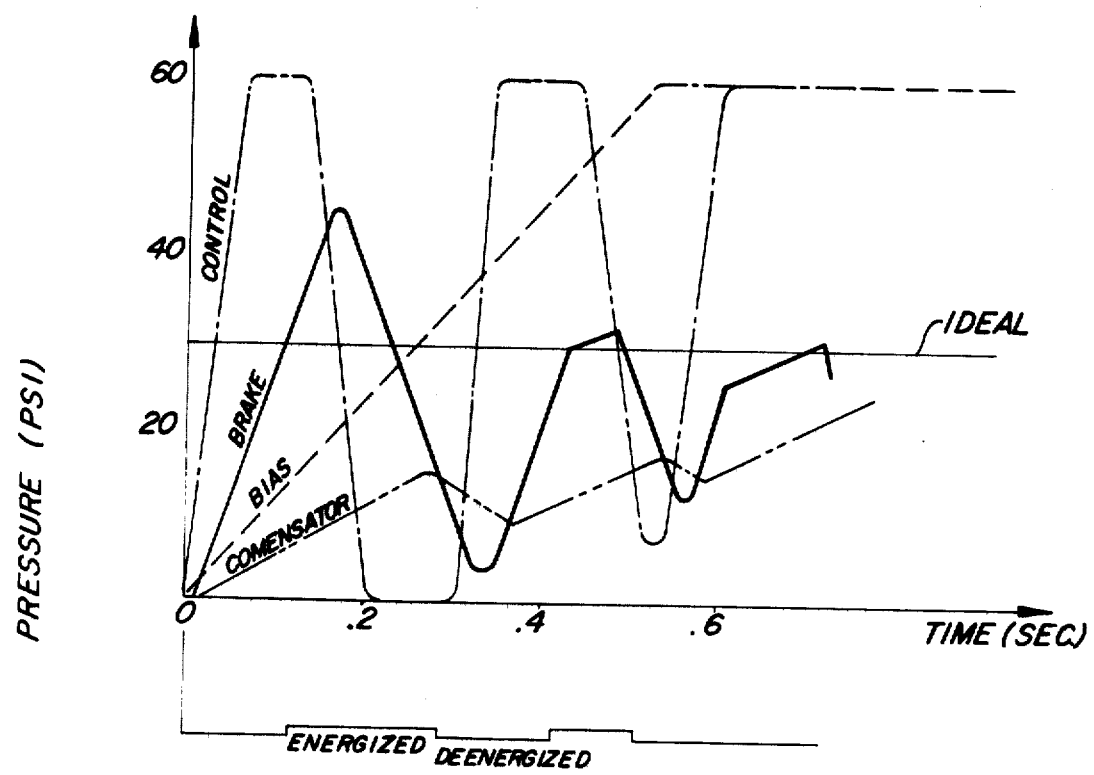
FIG. 6 is a graphic illustration of the presures in the various chambers of the valve during cyclical skid control operation.

Before describing the specific manner in which the valve 30 operates in each of these modes, reference may be had to FIG. 6 which illustrates graphically the relationship of the various chamber pressures in valve 30 as a function of time. The brake pressure curve illustrates the pressure in the brake pressure chamber as the valve cycles. As is apparent, the pressure in chamber 46 rises rapidly during initial brake application and, in a skid condition, overshoots the ideal brake pressure by a considerable amount, whereupon the skid logic circuit energizes solenoid valve 62 to release the brake pressure. The pressure in chamber 46 then drops off rapidly until the skid logic cirucit deenergizes the solenoid valve 62 and brake pressure is reapplied. During the initial or first stage portion of the reapplication cycle, the pressure in chamber 46 rises rapidly until the compensating function of the valve takes effect. This point in the cycle is represented by the knee or discontinuity 110 in the brake pressure curve. At this point in the cycle the valve enters the second stage in which the pressure in the chamber 46 increases at a much slower rate until an impending skid condition is again detected by the skid logic circuit and the valve is recycled. This two stage or knee effect in the brake chamber pressure curve increases the effectiveness of the braking by (1) allowing initial reapplication pressure to rise rapidly so that effective braking force is reestablished as rapidly as possible and (2), decreasing the brake pressure overshoot which, in turn, decreases the number of skid cycles required to bring the vehicle to a smooth and controlled stop as well as reduces air consumption.

Referring now to the specific operation of the valve in its compensating mode and assuming, for example, that the control pressure established by depression of the treadle valve 24 is 60 psi while the brake pressure required to lock the wheel 10 is 30 psi, the valve 30 will, during initial brake application, operate in the manner shown in FIG. 2 to introduce pressure to the brake actuator 14. As shown in FIG. 6, the pressure in the control chamber 44 very quickly rises to 60 psi and the pressure in brake pressure chamber 46 also rapidly rises substantially above the ideal brake pressure of 30 psi, thereby creating an impending wheel lock condition which is sensed by the logic circuit 38 and which energizes the solenoid valve 62. Upon actuation of solenoid valve 62, the valve 30 operates in the manner illustrated in FIG. 4. Thus, the core 66 moves down to close off the inlet passage 58 to the control chamber 44, thereby allowing the pressure in the control chamber 44 to exhaust through the exhaust port 68 to atmosphere and seal 80 to seat on valve seat 82 as previously described. This isolates the chamber 46 from the air supply. However, since the treadle valve 24 remains depressed, bias chamber 52 remains in communication with the air supply through the bias orifice 97 and therefore the pressure in the bias chamber 52 continues to rise while the brakes are being released. The pressure in compensator chamber 50 will also continue to rise for a brief period until evacuation of the brake pressure chamber has reduced the pressure in that chamber to a level below the level in the compensator chamber, at which point the compensator pressure begins to decrease. The resulting pressure imbalance across piston portion 89 causes the secondary piston 72 to move upward against the bias of springs 90, 92 into intimate contact with the lower end of primary piston 70.

With the relief of the brake pressure, the wheel 10 will run back up to speed and the logic circuit will act to deenergize the solenoid valve 62, thereby placing the control chamber 44 back in communication with the air supplied by the treadle valve 24. Once again, the pressure in the control chamber 44 will rise very rapidly back up to the pressure level established by the treadle valve 24. At this point, the valve is in its first stage reapply mode wherein the pressure acting downward on the primary piston 70 acts to unseat the valve and permit pressure to flow from the high pressure chamber to the brake pressure chamber 46. The brake pressure rises very rapidly until the pressures in the various chambers, together with the bias spring 92, coact to reseat the valve seal 82 and thereby establish the discontinuity or knee 110.

The manner in which the valve operates to establish the knee is best described by an analysis of the forces acting on the primary and secondary pistons. At the time when the solenoid valve 62 is deenergized and the first stage pressure rise commences, the pressures in the respective chambers, from FIG. 6, are approximately as follows:

Control 60 psi
Bias 40 psi
Compensator 11 psi
Brake 4 psi

In addition to these forces, the spring 92 acts on the secondary piston 72. The spring rate of spring 92 is selected such that it exerts a biasing force which is equivalent to a predetermined fluid pressure acting in the compensator chamber 50. For purposes of this disclosure, the spring 92 may be considered the equivalent of 8 psi acting in chamber 50.

The net pressure difference across the diaphram 54 multiplied by the effective area ($Ae$) of piston portion 88 gives the resulting downward force on the primary piston 70. Since the secondary piston 72 is in intimate contact with the primary pistion, the forces acting on the piston must also be considered. The pressure difference across the secondary pistion 89 multipled by its effective area (which is equal to the effective area of the primary piston) gives the resulting force acting on the secondary pistion. Thus:

Thus the net forces acting on the valve member are as follows, considering valve opening forces positive and valve closing forces negative:

$F_{net} = F_{primary} + F_{secondary} = (60-4) Ae + (11+8-40) Ae = (56-21) Ae$

From the foregoing analysis, it is apparent that the valve moves downward to admit pressure to the brakes, thereby providing the desired initial rapid rise in pressure.

As pressure is admitted to the chamber 46, the pressure in that chamber increases and begins to act upwardly on primary piston 70 in opposition to the downward forces exerted by the pressure in the control chamber 44. At the same time, the pressure in the compensator chamber 50 is increasing. Ultimately, pressure levels are reached which results in a net upward force acting on the primary piston to move it to a closed position, thereby producing the discontinuity or knee. As shown in FIG. 6, this discontinuity occurs at approximately 0.43 seconds into the stop, at which time the chamber pressures are as follows:

Control 60 psi
Bias 51 psi
Brake 29.5 psi
Compensator 12 psi
Spring 8 psi

The net forces acting on the valve are now as follows:
$F_{net} = (60-29.5) Ae + (12+8-51) Ae = (30.5-31) Ae$ Thus, the net forces act in an upward direction causing the valve to close. This closure will normally occur at a pressure level slightly below the ideal pressure and well below the pressure at which the skid signal was first generated.

The second stage of the brake pressure rise curve is determined by the compensator fill orifice 100 and the pressure drop across it. At the time the valve closed, as represented by the knee, the compensator chamber 50 was at a pressure substantially below the pressure in the brake chamber 46. As a result, pressure in the brake chamber continues to bleed through the fill orifice 100 into the compensator chamber. The bleeding of brake pressure into the compensator chamber 50 increases the compensator chamber pressure and thereby reduces the pressure differential across the secondary piston 89. This reduction in pressure differential causes a decrease in the net forces acting upward on the piston, thereby allowing a slight downward movement of the piston to permit pressure to bleed from high pressure chamber 48 into the brake pressure chamber 46. The rate at which the air flows between the two chambers is a function of the pressure rise rate in the compensator chamber 50. This results in a relatively slow second stage rise in pressure in the brake chamber and avoids any substantial overshooting with respect to the ideal brake pressure. By varying the size of the opening in fill orifice 100, the second stage rise rate can be varied.

The pressure in the chamber 46 rises at a slow rate until it exceeds the ideal brake pressure, at which time the skid logic will again signal an impending wheel lock and the valve will be recycled.

With the next cycle of the valve, the solenoid valve 62 is energized a significantly shorter period of time than in the first cycle since overshooting was substantially avoided thereby elminating the need for evacuation of excess brake prression. As a result, the chamber 46 is communicated to atmosphere a shorter period of time and the brake pressure level does not decrease as much as in the previous cycle. Correspondingly, the pressure in the compensator chamber is maintained at a significantly higher level than in the previous cycle. Of course, once the cycling of the valve 30 ceases, the pressure in the compensator chamber will approach the same value as the pressure in the brake chamber and the compensation effect will disappear.

The location of the knee in each cycle is dependent on the brake pressure time history of the previous cycle which, in turn, is dependent on various factors including the vehicle operator applied pressure, wheel lock-up pressure, road to tire coefficient of friction, wheel assembly inertia, brake characteristics and numerous other factors which affect vehicle braking performance. With particular reference to the valve 30, it will be appreciated that the compensator orifice 100 and the volume of the compensator chamber 50 have an effect on the position of the knee since, during the skid control cycle, the pressure in the compensator chamber is lowered below the average brake pressure. Once the bias chamber pressure has reached a steady state condition, that is, equal to the control pressure, the spring 92 is effective to establish the knee at a pressure which is a predetermined level above the compensator pressure. Thus, using the example heretofore given of a spring having a spring rate equivalent to 8 psi, the knee in the brake pressure rise curve will always occur at a pressure that is 8 psi above the compensator pressure. Since, in any brake system a certain minimum pressure, for example 5 psi, is required to overcome inertia, hysteresis effects and friction inherent in the brake structure, the bias spring 92 assures that the brake pressure will exceed the compensator pressure by an amount in excess of the minimum required pressure for actuation of the brakes, before the knee is established and the slow second stage pressure rise is obtained.

The operation of spring 92 in the valve has the advantage that in a very mild skid condition in which only slight excess brake pressure is applied, the valve will be recycled to correct the skid but the knee, with its attendant slow second stage, will not necessarily be produced. On the other hand, where substantial excess brake pressure is applied creating a more serious skid condition, the two stage pressure rise having the knee will be obtained as described.

While the invention has been described with reference to a preferred embodiment, neither the illustrated embodiment nor the terminology employed in describing it is intended to be limiting; rather, it is intended to be limited only by the scope of the appended claims.

What is claimed is:

1. A skid control system for use in controlling the braking pressure applied to a wheel, said system including a brake for applying braking forces to the wheel, a fluid pressure operated brake actuator for actuating said brake, skid control sensor means for detecting a skid condition at the wheel and generating an electrical signal in response thereto, a source of fluid pressure for application to said brake actuator, supply means for supplying a variable control pressure, and a compensating skid control valve in said system for cyclically applying fluid pressure to said brake actuator in response to the electrical signal generated by said skid control sensor means, the improvement comprising;

said skid control valve including a valve housing having a control pressure chamber, an inlet pressure chamber, an outlet pressure chamber, a compensating pressure chamber and a bias pressure chamber, a valve passage interconnecting said inlet and outlet pressure chambers, valve means for opening and closing said valve passage, said valve means including a first piston portion and a second piston portion, said first piston portion having a surface operatively exposed to the pressure in said control chamber and another surface operatively exposed to the pressure in said outlet pressure chamber, said second piston portion having a surface operatively exposed to the pressure in said compensating chamber and another surface operatively exposed to the pressure in said bias chamber, first flow passage means interconnecting said bias chamber with said fluid pressure source and second flow passage means interconnecting said outlet pressure chamber and said compensating chamber, the fluid pressure in said control chamber and said compensating chamber cooperating with said valve means to urge said valve means open, the pressure in said outlet chamber and said bias chamber acting on said valve means to urge said valve means closed, and biasing means operatively associated with said second piston portion to supplement the forces exerted on said second piston portion by the fluid pressure in said compensating chamber.

2. The system of claim 1 wherein said biasing means comprises spring means in said compensating chamber.

3. The system of claim 1 wherein the operatively exposed surfaces of said first and second piston portions are of substantially equal effective area.

4. In a skid control system for controlling the braking pressure applied to a wheel, a compensating skid control valve for supplying braking pressure, said skid control valve comprising;
  a valve housing having an inlet pressure chamber and a brake pressure chamber,
  piston valve means in said housing movable between open and closed positions for selectively interconnecting said pressure chambers,
  means for actuating said valve means to supply brake pressure to a wheel,
  means for cyclically actuating said valve means when a skid condition is present,
  pressure compensating means including a pressure compensating chamber operatively associated with said valve means for varying the position of said valve means during cyclical movement of said valve means independently of said cyclical actuating means to establish an inital rapid pressure rise followed by a slower pressure rise in said brake pressure chamber, means operative to maintain the initial rapid pressure rise in said brake pressure chamber until the pressure in said brake pressure chamber reaches a predetermined level above the pressure in said pressure compensating chamber, and
  means operative to maintain the second stage pressure rise in said brake pressure chamber including a fill orifice for bleeding brake pressure from said brake chamber into said compensator chamber.

5. The system of claim 4 wherein said means operative to maintain the initial rapid pressure rise in said brake pressure chamber comprises spring means acting on said valve means.

6. In a skid control system for controlling the application of fluid pressure to fluid actuated brakes, a valve adapted for the cylical application of fluid pressure from a constant fluid pressure source to said fluid actuated brakes, said valve comprising:
  a valve housing having an inlet pressure chamber adapted to be connected to the pressure source and an outlet pressure chamber,
  an exhaust port in said housing,
  valve means movable between an open and closed position for selectively interconnecting said pressure chambers,
  fluid pressure operated control means for selectively actuating said valve means and communicating said exhaust port with said outlet chamber when said valve means is in a closed position,
  operator means for cyclically applying control pressure to said control means to open said valve means and for cyclically releasing pressure on said control means to close said valve means and communicate said exhaust port with said outlet chamber, and
  means operatively associated with said valve means for varying the position of said valve means during the cylical application of control pressure to said control means whereby the pressure in said outlet chamber rises first at a rapid rate and subsequently at a lower rate.

7. The valve of claim 6 wherein said control means comprises a control chamber and a control diaphragm separating said outlet chamber from said control chamber,
  said valve means comprising reciprocating piston means having a portion thereof operatively engageable with said control diaphragm whereby control pressure introduced to said control chamber by said operator means acts against said control diaphragm to move said piston means to an open position,
  said means operatively associated with said valve means comprising pressure compensating means communicating with the control pressure and the pressure in said outlet chamber for exerting pressure forces on said piston means.

8. The valve of claim 7 wherein said pressure compensating means includes a pressure compensating chamber with a further portion of said piston means extending thereinto,
  said pressure compensating chamber being in fluid communication with said outlet chamber.

9. The valve of claim 8 wherein said compensating means further includes bias means operatively associated with said piston means and acting to exert forces on said piston means in opposition to the forces exerted on said piston means by the pressure in said compensating chamber.

10. The valve of claim 9 wherein said bias means comprises a bias chamber in fluid communication with the control pressure and a bias diaphragm separating said bias chamber and said compensating chamber,
  said bias diaphragm being in operative engagement with said further portion of said piston means in said compensating chamber with the area of operative engagement of said bias diaphragm being less tha the operative area of engagement of said control diaphragm with said piston means.

11. The valve of claim 10 wherein said compensating means further includes flow restricting means restricting the rate of pressure rise in said compensating chamber and said bias chamber.

12. The valve of claim 7 wherein said piston means comprises a primary piston and a secondary piston with said primary piston being operatively engageable with said control diaphragm,
  said pressure compensating means including a pressure compensating chamber with said secondary piston being reciprocably supported in said compensating chamber,
  a bias chamber in fluid communication with the control pressure and a bias diaphragm separating said bias chamber and said compensating chamber,
  said bias diaphragm being in operative engagement with said secondary piston with the area of operative engagement of said bias diaphragm being less than the area of operative engagement of said control diaphragm with said primary piston, and
  fluid passage means communicating said compensating chamber with said outlet chamber,
  said fluid passage means including flow restricting means restricting the rate of pressure rise in said compensating chamber.

13. The valve of claim 12 wherein said flow restricting means includes a fill orifice and an exhaust orifice.

14. A skid control system for use in controlling the braking pressure applied to a wheel, said system including a brake for applying braking forces to the wheel, a fluid pressure operated brake actuator for actuating said brake, skid control sensor means for detecting a skid condition at the wheel and generating an electrical signal in response thereto, a source of fluid pressure for application to said brake actuator, supply means for supplying a variable control pressure, and a compensating skid control valve in said system for cyclically applying fluid pressure to said brake actuator in response to the signals generated by said skid control sensor means, the improvement comprising:

said skid control valve including a valve housing having an inlet pressure chamber connencted to said fluid source and a brake pressure chamber connected to said brake actuator, valve means in said housing and movable between open and closed positions for selectively interconnecting said pressure chambers, fluid pressure operated control means for controlling movement of said valve means and including solenoid operated means for cyclically applying control pressure from said supply means to open said valve means, and pressure compensating means operatively associated with said valve means for varying the position of said valve means during the cyclical application of control pressure and operative to establish an initial rapid pressure rise in said brake pressure chamber followed by a slower pressure rise in said chamber.

15. The system of claim 14 wherein said control means comprises a control chamber and a control diaphragm separating said brake pressure chamber from said control chamber.

said valve means comprising reciprocating piston means having a portion thereof operatively engageable with said control diaphragm whereby control pressure introduced to said control chamber by said solenoid means acts against said control diaphragm to move said piston means to an open position, said means operatively associated with said valve means comprising pressure compensating means communicating with the control pressure and the pressure in said brake pressure chamber for exerting pressure forces on said piston means.

16. The system of claim 15 wherein said pressure compensating means includes a pressure compensating chamber with a further portion of said piston means extending thereinto, said pressure compensating chamber being in fluid communication with said brake pressure chamber.

17. The system of claim 16 wherein said compensating means further includes bias means operatively associated with said piston means and acting to exert forces on said piston means in opposition to the forces exerted on said piston means by the pressure in said compensating chamber.

18. The system of claim 15 wherein said piston means comprises a primary piston and a secondary piston with said primary piston being operatively engageable with said control diaphragm, said pressure compensating means including a pressure compensating chamber with said secondary piston being reciprocably supported in said compensating chamber, a bias chamber in fluid communication with the control pressure and a bias diaphragm separating said bias chamber and said compensating chamber, said bias diaphragm being in operative engagement with said secondary piston with the area of operative engagement of said bias diaphragm being less than the area of operative engagement of said control diaphragm with said primary piston, and fluid passage means communicating said compensating chamber with said outlet chamber, said fluid passage means including flow restricting means restricting the rate of pressure rise in said copensating chamber.

19. The system of claim 18 wherein said solenoid operated means comprises a solenoid operated valve, said fluid communication of said bias chamber with the control pressure from said supply means being independent of the operation of said solenoid valve.

20. The system of claim 14 wherein said valve means includes a portion thereof exposed to the pressure in said brake pressure chamber with the pressure acting on said valve means in a direction to move said valve means to a closed position, said pressure compensating means including a compensating pressure chamber, said valve means including a further portion thereof exposed to the pressure in said compensating chamber with the pressure acting on said further portion of said valve means in a direction to open said valve means.

21. The system of claim 14 wherein said control means includes a control chamber, said valve means comprising reciprocating piston means having a portion thereof operatively exposed to the control pressure in said control chamber, said means operatively associated with said valve means comprising pressure compensating means communicating with the control pressure forces on said piston means.

22. The system of claim 21 wherein said pressure compensating means includes a pressure compensating chamber with a further portion of said piston means extending thereinto, said presure compensating chamber being in fluid communication with said brake pressure chamber;

said compensating means further including bias means operatively associated with said piston means and acting to exert forces on said piston means in opposition to the forces exerted on said piston means by the pressure in said compensating chamber.

23. The system of claim 21 wherein said piston means comprises a primary piston and a secondary piston, said pressure compensating means including a pressure compensating chamber with said secondary piston being reciprocally supported in said compensating chamber, a bias chamber in fluid communication with the control pressure, said secondary piston having a portion thereof operatively exposed to the pressure in said bias chamber, and fluid passage means communicating said compensating chamber with said brake pressure, said fluid passage means including flow restricting means restricting the rate of pressure rise in said compensating chamber.

* * * * *